Figure 1:
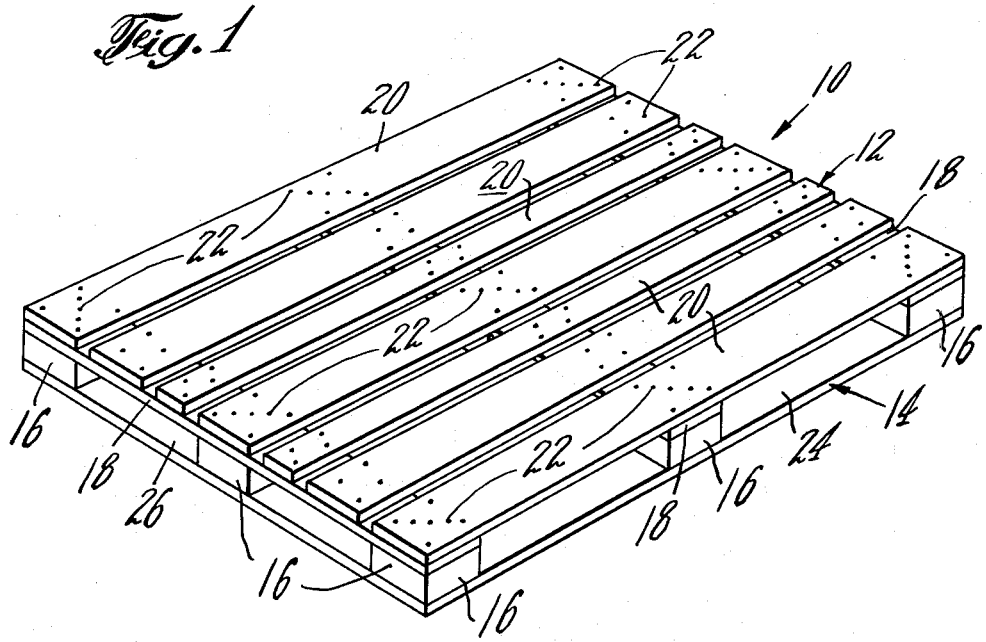

Sept. 7, 1965  S. S. NICHOLSON  3,204,583
SHIPPING DEVICE
Filed Dec. 27, 1963

INVENTOR.
SAMUEL S. NICHOLSON
BY George P. Ziehmer
ATTORNEY

United States Patent Office 3,204,583
Patented Sept. 7, 1965

3,204,583
SHIPPING DEVICE
Samuel S. Nicholson, River Edge, N.J., assignor to American Can Company, New York, N.Y., a corporation of New Jersey
Filed Dec. 27, 1963, Ser. No. 333,811
1 Claim. (Cl. 108—51)

The present invention relates to shipping devices and has particular reference to a four-way wooden pallet which is formed with a mitered bottom deck of improved construction which adds substantially to the strength and anticipated life of the pallet.

In order to reduce shipping costs, the can manufacturing industry, in common with many other industries, has turned to an increasing degree to the delivery of its products in palletized loads. This trend has been abetted by the development of automatic equipment which can both palletize and depalletize cans at the rate of many hundreds of cans per minute. Such equipment has made it necessary to handle and convey the pallets, both loaded and unloaded, by means of fork lift trucks as well as automatic conveyor systems and other automatic mechanisms.

Because of the fact that these palletized loads are handled in many different packing plants wherein there is wide diversity in the pallet handling systems and mechanisms, it has heretofore been found necessary for the can manufacturer who services these plants to supply a number of different types of pallets to meet the varying demands of the handling systems of these plants. This situation is quite inflexible, since these pallets are returned to the can manufacturer and reused over and over again until they are so damaged that they must be discarded, and the need to keep the pallets sorted to make them available to specific customers is a time consuming operation.

In addition, the fact that palletized cans are relatively unstable requires that the pallets be sturdily built and consequently relatively expensive, and thus it is necessary that the pallets be resistant to the abuse to which they are normally subjected in order that they have a sufficiently long service life to make their use economically feasible.

The present invention provides a pallet which satisfies all of these requirements, and is superior in almost all respects to conventional pallets and which is therefore very well adapted for use as a universal pallet which can be substituted for most, if not all, of the pallets presently used in the can manufacturing industry, although its use is not limited thereto.

As an indication of the superiority of the pallet of the present invention, it has been found that the present pallet, which permits four-way entry of the tines of a lift fork truck, when subjected to the revolving drum test convincingly out-performed all of the control pallets which constituted pallets presently used in the industry.

The revolving drum test to which the pallets were subjected involves the placing of a pallet under test in a 14 foot diameter drum which has a series of hazards secured at spaced intervals to its inner surface so that the pallet is caught by a hazard and carried up toward the top of the drum and then dropped from the hazard three times per revolution, when the drum is rotated at one revolution per minute. This test simulates extremely rough handling of the pallets, and was continued until three deck boards had been knocked completely off the pallet, which was considered to be an indication of failure. As a result of such tests, the present pallet was shown to have a 64% longer anticipated service life than the standard two way entry pallet of comparable size and weight which was used as a control. This result is remarkable when it is realized that because of the necessity of providing fork receiving openings on all four of their sides, four-way pallets cannot use solid stringers to tie the top and bottom decks together, but must instead use spacer blocks, whereas two-way pallets do use solid stringers for this purpose.

In addition to outperforming the two-way pallets which had theretofore been considered as the strongest in the industry, the present pallet outlasted a group of four-way controls, which were improved versions of the commerically used four-way pallets, by an average of 200 percent. These impressive performance gains have been attributed directly to the bottom deck design of the improved pallet of the instant invention.

An object of the invention, therefore, is the provision of a four-way pallet incorporating a unique bottom deck construction which is substantially stronger than the heretofore known bottom deck designs.

Another object is the provision of such a pallet which provides smooth bearing surfaces on all four bottom edge portions to enable it to ride smoothly in any direction on roller conveyors.

A still further object is the provision of such a pallet wherein the bottom deck is only one board thick, to thereby reduce the amount of board required and to increase the height of the spacer blocks between the top and bottom decks of the pallet.

Numerous other objects and advantages of the invention will be apparent as it is better understood from the following description, which, taken in connection with the accompanying drawings, discloses a preferred embodiment thereof.

Figure 2:
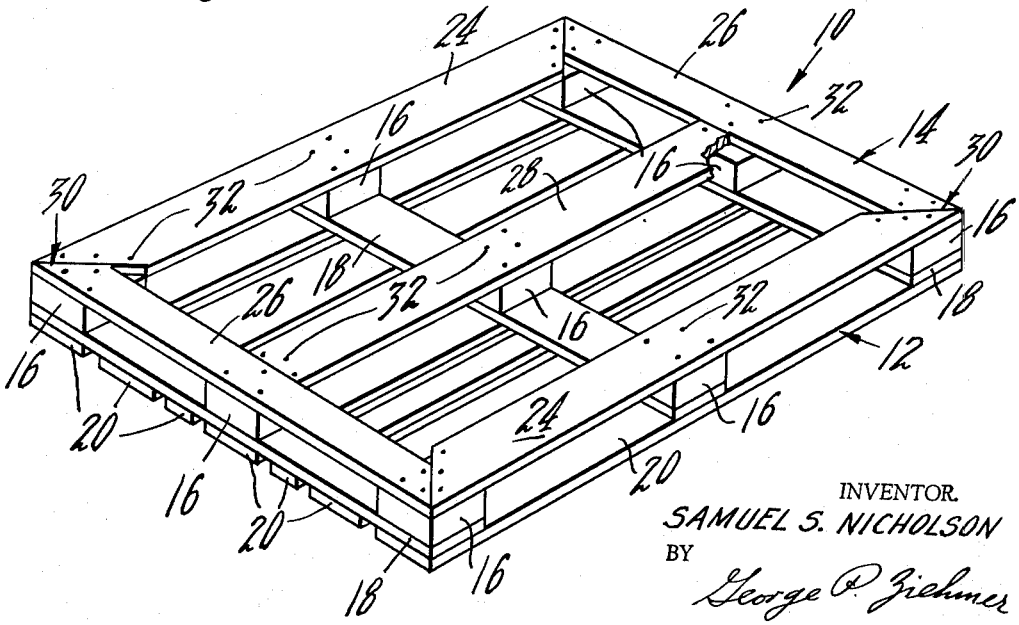

Referring to the drawings:

FIGURE 1 is a perspective view of a pallet embodying the principles of the instant invention; and FIG. 2 is a perspective view of the pallet of FIG. 1 in inverted position and showing clearly the construction of its bottom deck.

As a preferred and exemplary embodiment of the instant invention, the drawings disclose a rectangular pallet 10 comprising a top deck 12, a bottom deck 14, and a group of nine spacer blocks 16 which tie the top and bottom decks together in such manner that each of the four sides of the pallet 10 is provided with a pair of openings which constitute the ends of passageways which extend completely through the pallet and provide the means whereby the two spaced tines (not shown) of a conventional lift fork truck or other mechanism may be inserted into any side of the pallet to thereby facilitate ease of handling.

As seen in the drawings, the blocks 16 are square in horizontal cross-section and are positioned so that one block 16 is located at each corner of the pallet, one block 16 is positioned along each edge of the pallet midway between its corners, and one block 16 is located at the center of the pallet. The height of the blocks 16 is adequate to permit the insertion of the lift truck fork tines.

The top deck 12 which is adapted to support the articles which are placed on the pallet 10, comprise stringer boards 18 which preferably are of the same width as the blocks 16 and which extend across the full width of the pallet, and a plurality of deck boards 20 which are disposed at right angles to the stringer boards 18 and extend for the full length of the pallet 10. The two outside deck boards and the center deck board are of the same width as and are vertically aligned with the blocks 16, the intermediate deck boards being of suitable widths to prevent the occurrence of excessively wide gaps in the upper surface of the top deck 12. In constructing the pallet, the deck boards 20 are preferably first secured to the stringer boards 18 with clinched nails to make the top deck 12 a unitary structure, and the top deck 12 is then nailed to the spacer blocks 16. The nails used in securing these various boards and blocks together are designated by the numeral 22.

The bottom deck 14 comprises a pair of edge boards 24 which run the length of the pallet and are of the same width as the blocks 16; a pair of narrow edge boards 26 which are about two-thirds the width of the blocks 16, and a center deck board 28 which is of the same width as the blocks 16 and is parallel to the edge boards 24 and spans the gap between the narrow edge boards 26. The corners of the four edge boards 24, 26 are mitered as at 30 to bring all of the mitered edges into mutual engagement, and all of the bottom deck boards 24, 26, 28 are secured directly to the spacer blocks 16 by nails 32, to securely tie the whole pallet together into an extremely sturdy structure which is exceptionally resistant to abuse. The narrowness of the deck boards 26 makes it possible for the ends of the center deck board 28 to overlie about one-third of the center spacer blocks 16 on the short sides of the pallet, and to be nailed directly to them. The fact that all nine spacer blocks are thus tied together by the bottom deck, plus the mitered corner construction of the edge deck boards 24, 26 (which has resulted in this bottom deck being referred to as a "picture-frame" bottom deck) makes possible a bottom deck which has a thickness of only a single board, and yet is extremely resistant to racking, i.e. the tendency to become out-of-square when dropped in such manner as to land on a corner. Such racking resistance is vital, since out-of-square pallets frequently will not pass through the pallet feeding devices, which frequently have only limited clearance.

This construction also has an important additional advantage in that since all of the blocks 16 are of uniform dimension, and since the centrally disposed block 16 is in alignment with the blocks 16 which are disposed midway between the corners on all sides of the pallet, each of the passageways which extend both lengthwise and crosswise of the pallet for the insertion of the lift truck forks is of uniform width for its entire length, and has no interior portions which are narrower than the openings at its opposite ends. Thus there are no projections in the interior of the passageways which would interfere with the insertion of the tines of the fork truck.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

A rectangular pallet, comprising:
a top deck,
a bottom deck, and
a group of nine spacer blocks disposed between said top and bottom decks, said spacer blocks being substantially uniform in dimension, one of said spacer blocks being located on each of the four corners of said pallet, one of said spacer blocks being located substantially midway along each of the four sides of said pallet, and one of said spacer blocks being located at the center of said pallet,
said bottom deck comprising two parallel pairs of edge boards which extend around the four sides of said pallet and which meet in mitered corners, the edge boards of one of said pairs being of substantially the same width as said spacer blocks, the edge boards of the other of said pairs being substantially narrower than the edge boards of said one pair to cover only a portion of each of the spacer blocks which are disposed midway along the sides of the pallet along which said narrower pair of edge boards extends, and a center board extending substantially parallel to said one pair of edge boards and extending substantially perpendicular to and spanning the gap between said narrower pair of edge boards, the end portions of said center board being disposed over and secured to the uncovered portions of said spacer blocks which are disposed midway along the sides of the pallet along which said narrower pair of edge boards extends.

References Cited by the Examiner

UNITED STATES PATENTS

| | | | |
|---|---|---|---|
| 1,354,509 | 10/20 | Nold | 206—60 |
| 1,665,266 | 4/28 | Huston | 217—43 |
| 2,468,026 | 4/49 | Boone | 108—57 |
| 2,503,022 | 4/50 | Benoist et al. | 108—53 |
| 2,542,129 | 2/51 | Fletcher | 108—53 |
| 2,930,560 | 3/60 | Carnwath et al. | 108—56 |
| 3,123,020 | 3/64 | Voissem | 108—51 |

FOREIGN PATENTS 909,534  10/62  Great Britain.

FRANK B. SHERRY, *Primary Examiner.*